United States Patent
Guo

(10) Patent No.: US 12,160,378 B2
(45) Date of Patent: *Dec. 3, 2024

(54) METHOD AND APPARATUS FOR SPATIAL REUSE BASED ON MULTI-ACCESS POINT AP

(71) Applicant: HUAWEI TECHNOLOGIES CO., LTD., Guangdong (CN)

(72) Inventor: Yuchen Guo, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,681

(22) Filed: Sep. 6, 2023

(65) Prior Publication Data

US 2024/0072951 A1    Feb. 29, 2024

Related U.S. Application Data

(63) Continuation of application No. 17/931,695, filed on Sep. 13, 2022, now Pat. No. 11,784,766, which is a
(Continued)

(30) Foreign Application Priority Data

May 23, 2018   (CN) .......................... 201810501886.6

(51) Int. Cl.
*H04L 5/00* (2006.01)
*H04W 52/14* (2009.01)
(Continued)

(52) U.S. Cl.
CPC ......... *H04L 5/0032* (2013.01); *H04W 52/143* (2013.01); *H04W 72/044* (2013.01); *H04W 72/21* (2023.01); *H04W 84/12* (2013.01)

(58) Field of Classification Search
CPC . H04W 72/21; H04W 52/143; H04W 72/044; H04W 84/12; H04L 5/0032
(Continued)

(56) References Cited

U.S. PATENT DOCUMENTS

2016/0174079 A1   6/2016  Wang et al.
2017/0294992 A1  10/2017  Chu et al.
(Continued)

FOREIGN PATENT DOCUMENTS

CN    106603211 A    4/2017
CN    106851848 A    6/2017
(Continued)

OTHER PUBLICATIONS

Intel Inc., On the modem in-home distribution architecture, SG15-C0560, Study Group 15, International Telecommunication Union, Study Period 2011-2020, Geneva, Jan. 29-Feb. 9, 2018, 5 pages.
(Continued)

*Primary Examiner* — Gbemileke J Onamuti
(74) *Attorney, Agent, or Firm* — WOMBLE BOND DICKINSON (US) LLP

(57) ABSTRACT

This application provides a spatial reuse method and apparatus based on multi-access point (AP) coordination, and a system. In the method, a first access point AP sends a radio frame including identification information to a second access point AP. The identification information is used to indicate the second access point AP to perform spatial reuse during uplink data transmission performed by at least one first station associated with the first access point. The second access point sends a downlink frame to at least one second station based on the identification information. Through coordination between access points APs, the first AP may configure a spatial reuse transmission opportunity for another specific AP to perform spatial reuse transmission, so
(Continued)

that a transmission time in the spatial reuse transmission opportunity is fully used, thereby avoiding a conflict and improving transmission efficiency.

17 Claims, 10 Drawing Sheets

Related U.S. Application Data continuation of application No. 17/100,266, filed on Nov. 20, 2020, now Pat. No. 11,476,986, which is a continuation of application No. PCT/CN2019/087101, filed on May 15, 2019.

(51) Int. Cl.
*H04W 72/044* (2023.01)
*H04W 72/21* (2023.01)
*H04W 84/12* (2009.01)

(58) Field of Classification Search
USPC .......................................................... 370/329
See application file for complete search history.

(56) References Cited

U.S. PATENT DOCUMENTS

| | | |
|---|---|---|
| 2017/0325178 A1 | 11/2017 | Verma et al. |
| 2017/0325202 A1 | 11/2017 | Verma et al. |
| 2018/0084472 A1 | 3/2018 | Cariou et al. |
| 2018/0124858 A1 | 5/2018 | Gan et al. |
| 2019/0021007 A1 | 1/2019 | Zhou et al. |
| 2019/0090140 A1 | 3/2019 | Bahr |
| 2019/0288767 A1 | 9/2019 | Wang et al. |

FOREIGN PATENT DOCUMENTS

| | | |
|---|---|---|
| CN | 107210901 A | 9/2017 |
| WO | 2017096918 A1 | 6/2017 |
| WO | 2017120418 A1 | 7/2017 |
| WO | 2017121301 A1 | 7/2017 |
| WO | 2018059593 A1 | 4/2018 |

OTHER PUBLICATIONS

Oghenekome Oteri et al, "Improved Spatial Reuse for Dense 802.11 WLANs", 2015 IEEE Globecom Workshops (GC Wkshps), Feb. 25, 2016, total 6 pages.

METHOD AND APPARATUS FOR SPATIAL REUSE BASED ON MULTI-ACCESS POINT AP

CROSS-REFERENCE TO RELATED APPLICATIONS

This application is a continuation of U.S. patent application Ser. No. 17/931,695, filed on Sep. 13, 2022, which is a continuation of U.S. patent application Ser. No. 17/100,266, filed on Nov. 20, 2020, now U.S. Pat. No. 11,476,986. which is a continuation of International Application No. PCT/CN2019/087101, filed on May 15, 2019. The International Application claims priority to Chinese Patent Application No. 201810501886.6, filed on May 23, 2018. All of the afore-mentioned patent applications are hereby incorporated by reference in their entireties.

TECHNICAL FIELD

This application relates to the field of communications technologies, and in particular, to a spatial reuse technology.

BACKGROUND

Spatial reuse (SR for short) is a multi-cell parallel transmission method defined in the 802.11ax standard, and specifically includes two forms: One form is overlapping basic service set packet detect based spatial reuse (OBSS PD-based SR), and the other form is spatial reuse parameter based spatial reuse (SRP-based SR).

In the OBSS PD-based SR, when a node receives a transmission frame from another cell, the node may appropriately increase a clear channel assessment (CCA) threshold of the node, and reduce a transmit power of the node. Therefore, the node obtains more transmission opportunities. In addition, it is ensured that the node does not cause excessive interference to transmission of the another cell.

The SRP-based SR is a trigger-based (Trigger-based) transmission spatial reuse method. Trigger-based transmission means that: an access point (AP) sends a trigger frame, where the trigger frame includes resource scheduling information used to schedule one or more stations (STA) to send a trigger-based physical layer protocol data unit (TB PPDU), that is, uplink transmission triggered by the AP; and when a node receives a trigger frame from another cell, the node may perform transmission in a time period of the trigger-based data physical layer protocol data unit through appropriate power control.

However, in the prior art, after identifying a spatial reuse parameter SRP based spatial reuse opportunity, the node still needs to contend for a channel. As a result, a part of a transmission time is lost. In addition, any node may identify an SRP transmission opportunity. If a plurality of nodes successfully contend for a channel at a same time, a transmission conflict may be caused when the plurality of nodes perform transmission at the same time, thereby causing a transmission failure.

With development of a wireless network and continuous popularization of a wireless local area network (WLAN) technology, WLAN devices become increasingly dense. Because it is easy to deploy a wireless access point, increasingly dense APs bring more inter-cell interference. How to reduce a transmission time loss and a transmission conflict in spatial reuse, reduce inter cell interference, and improve transmission efficiency is a problem that needs to be considered in the WLAN technology.

SUMMARY

This application provides a method and an apparatus for spatial reuse based on multi-access point AP coordination, to reduce a transmission time loss and a transmission conflict in spatial reuse through coordination between APs and improve transmission efficiency.

According to a first aspect, an embodiment of this application provides a spatial reuse method. In the method, a first access point AP 1 sends, to a second access point AP 2, a radio frame including identification information. The identification information is used to enable the second access point AP 2 to perform spatial reuse during uplink data transmission performed by at least one first station associated with the first access point and to send a downlink frame to at least one second station. Through coordination between access points APs, an access point may configure an SRP transmission opportunity for another specific AP to perform downlink transmission, thereby making full use of a transmission time in the SRP transmission opportunity. In addition, the following case is avoided: A transmission conflict is caused due to simultaneous transmission after a plurality of nodes including the second access point AP 2 identify the transmission opportunity and successfully contend for a channel, thereby reducing a transmission time loss and a transmission conflict and improving transmission efficiency.

According to a second aspect, an embodiment of this application provides a spatial reuse method. The method includes: A second access point AP 2 receives a radio frame that includes identification information and the radio frame is sent by a first access point AP 1. The identification information is used to indicate that the second access point AP 2 is to perform spatial reuse during uplink data transmission performed by at least one first station associated with the first access point and to send a downlink frame to at least one second station. Through coordination between access points APs, an access point may configure an SRP transmission opportunity for another specific AP to perform downlink transmission, thereby making full use of a transmission time in the SRP transmission opportunity, reducing a transmission time loss and a transmission conflict, and improving transmission efficiency.

It should be noted that "during uplink data transmission performed by at least one first station associated with the first access point" may indicate a time interval in which the at least one first station associated with the first access point sends an uplink data packet. The time interval may be a time range between a start moment and an end moment of sending the uplink data packet by the at least one first station associated with the first access point. In addition, it may be understood that information used to indicate duration of the uplink data transmission may be carried in the radio frame sent by the first access point AP, for example, a trigger frame; or may be carried in another frame. In this way, after obtaining the SRP transmission opportunity specified by the first AP, the second access point may perform data transmission during the uplink data transmission performed by the at least one first station associated with the first access point.

With reference to the first aspect or the second aspect, in a possible implementation, the radio frame includes a spatial reuse parameter required when the second access point determines a transmit power for the downlink frame. The second access point AP 2 may determine an appropriate transmit power based on the spatial reuse parameter, to avoid excessive interference caused to the second access point AP 2 by the downlink frame sent by the second access point during the uplink data transmission performed by the first station associated with the first access point.

With reference to the first aspect or the second aspect, in a possible implementation, the radio frame is a first trigger frame, a first user information field in the first trigger frame includes an association identifier field, and the identification information is carried in the association identifier field. In an example, an association identifier is a special value, and the association identifier may be a special 12-bit ID determined after negotiation between the AP 1 and the AP 2. Based on the special association identifier, the second AP may determine that the second AP is scheduled by the first AP. The association identifier field is used as a reuse indication. No additional bit needs to be added to carry the identification information, thereby reducing signaling overheads.

With reference to the first aspect or the second aspect, in a possible implementation, the radio frame is a first trigger frame, the first trigger frame includes a resource unit allocation field, and the identification information is carried in the resource unit allocation field. In an example, a value of the resource unit allocation field is a reserved value, and the second AP may determine, based on the value of the resource unit allocation field, that the second AP is scheduled by the first AP to perform spatial reuse during the uplink data transmission performed by the at least one first station associated with the first AP. The resource unit allocation field is used as a reuse indication. No additional bit needs to be added to carry the identification information, thereby reducing signaling overheads.

With reference to the first aspect or the second aspect, in a possible implementation, when the second access point is a fronthaul AP of a second multi-AP device, the first access point is a fronthaul AP of a first multi-AP device, the first multi-AP device is a parent node of the second multi-AP device, the at least one second station is a backhaul STA of the second multi-AP device, and the backhaul STA is associated with the first access point, the identification information is an association identifier AID of the backhaul STA. Optionally, when the backhaul STA is associated with the first access point, the radio frame may further include indication information. The indication information is used to indicate whether the radio frame is used to trigger the first access point. The following case may be avoided by using the indication information: The backhaul STA mistakenly considers the radio frame as a radio frame for scheduling the backhaul STA.

With reference to the first aspect or the second aspect, in a possible implementation, the radio frame includes resource allocation information, and the resource allocation information is used to indicate a resource unit carrying a downlink frame.

According to a third aspect, an embodiment of this application provides a method for spatial reuse transmission based on multi-access point AP coordination. The method includes: A second access point AP 2 receives a radio frame sent by a first access point AP 1. The radio frame includes identification information. The identification information is used to indicate that the second access point is to perform spatial reuse during uplink data transmission performed by at least one first station associated with a first access point. The second access point sends a second trigger frame to at least one second station. The second trigger frame is used to indicate that the at least one second station is to send an uplink frame to the second access point. Through coordination between access points APs, the first access point may configure an SRP transmission opportunity for another specific AP to trigger a station to perform uplink transmission, thereby making full use of a transmission time in the SRP transmission opportunity, reducing a transmission time loss and a transmission conflict, and improving transmission efficiency.

According to a fourth aspect, an embodiment of this application provides a spatial reuse method. In the method, a first access point AP 1 sends, to a second access point AP 2, a radio frame including identification information. The identification information is used to indicate that the second access point AP 2 is to perform spatial reuse during uplink data transmission performed by at least one first station associated with the first access point and to send a trigger frame to at least one second station to trigger the at least one second station to send an uplink frame. Through coordination between access points APs, the first access point may configure an SRP transmission opportunity for another specific AP to perform uplink transmission, thereby making full use of a transmission time in the SRP transmission opportunity. In addition, the following case is avoided: A transmission conflict is caused due to simultaneous transmission after a plurality of nodes including the second access point AP 2 identify the transmission opportunity and successfully contend for a channel, thereby reducing a transmission time loss and a transmission conflict and improving transmission efficiency.

It should be noted that "during uplink data transmission performed by at least one first station associated with the first access point" may indicate a time interval in which the at least one first station associated with the first access point sends an uplink data packet. The time interval may be a time range between a start moment and an end moment of sending the uplink data packet by the at least one first station associated with the first access point. In addition, it may be understood that information used to indicate duration of the uplink data transmission may be carried in the radio frame sent by the first access point AP, for example, a trigger frame; or may be carried in another frame. In this way, after obtaining the SRP transmission opportunity specified by the first AP, the second access point may perform data transmission during the uplink data transmission performed by the at least one first station associated with the first access point.

With reference to the third aspect or the fourth aspect, in a possible implementation, the radio frame further includes a spatial reuse parameter SRP. The spatial reuse parameter is used by the second access point to determine a transmit power for the uplink frame, and the spatial reuse parameter is further used by the at least one second station to determine a first maximum transmit power of the at least one second station. The second access point AP 2 may determine an appropriate transmit power based on the spatial reuse parameter, to avoid excessive interference caused to receiving performed by the first access point AP 1 by the uplink frame sent by the at least one second station associated with the second access point during the uplink data transmission performed by the at least one first station associated with the first access point. Specifically, the first maximum transmit power=the spatial reuse parameter−a receive power that is measured by the at least one second station for the radio frame.

With reference to the third aspect or the fourth aspect, in a possible implementation, the radio frame is a first trigger frame. A first user information field in the first trigger frame includes an association identifier field, and the identification information is carried in the association identifier field. Alternatively, the first trigger frame includes a resource unit allocation field, and the identification information is carried in an association identifier field or the resource unit allocation field. The association identifier field or the resource unit allocation field is used as a reuse indication. No additional bit needs to be added to carry the identification information, thereby reducing signaling overheads. With reference to the third aspect or the fourth aspect, in a possible implementation, when the second access point is a fronthaul AP of a second multi-AP device, the first access point is a fronthaul AP of a first multi-AP device, the first multi-AP device is a parent node of the second multi-AP device, the at least one second station is a backhaul STA of the second multi-AP device, and the backhaul STA is associated with the first access point, the identification information is an association identifier of the backhaul STA.

When the backhaul STA is associated with the first access point, the radio frame may further include indication information. The indication information is used to indicate whether the radio frame is used to trigger the first access point. The following case may be avoided by using the indication information: The backhaul STA mistakenly considers the radio frame as a radio frame for scheduling the backhaul STA.

With reference to the third aspect or the fourth aspect, in a possible implementation, the second trigger frame further includes a transmit power at which the second access point sends the second trigger frame, and a target receive power of the second access point. The transmit power at which the second access point sends the second trigger frame is used by the at least one second station to determine a second maximum transmit power of the at least one second station. In an example, the second maximum transmit power=the target receive power of the second access point+the transmit power at which the second access point sends the second trigger frame−a receive power that is measured by the at least one second station for the second trigger frame.

With reference to the third aspect or the forth aspect, in a possible implementation, when the first maximum transmit power is greater than or equal to the second maximum transmit power, the method further includes: The second access point receives the uplink frame that is sent by the at least one second station by using the second maximum transmit power. The transmit power of the station is controlled by using the SRP parameter, so that the at least one second station ensures that the sent uplink frame can be successfully received by the second access point AP without affecting receiving performed by the first access point AP. When the first maximum transmit power is less than the second maximum transmit power, the method further includes: The second access point receives the uplink frame that is sent by the at least one second station by using the first maximum transmit power.

In a possible implementation, the second trigger frame further includes a transmission indication. The transmission indication is used to indicate whether the at least one second station sends the uplink frame when the second maximum transmit power is greater than the first maximum transmit power.

In a possible implementation, the second trigger frame further includes a transmission indication. The transmission indication is used to indicate a preset value. When a difference obtained by subtracting the first maximum transmit power from the second maximum transmit power is greater than or equal to the preset value, the second access point AP receives the uplink frame that is sent by the at least one second station by using the first maximum transmit power. When a difference obtained by subtracting the first maximum transmit power from the second maximum transmit power is less than the preset value, the second access point cannot receive the uplink frame that is sent by the at least one second station, that is, the at least one second station does not send the uplink frame.

According to a fifth aspect, an embodiment of this application provides a spatial reuse transmission method. The method includes: A second station receives a radio frame that includes identification information and that is sent by a first access point. The identification information is used to indicate that the second access point is to perform spatial reuse during uplink data transmission performed by at least one first station associated with the first access point and to send a second trigger frame to at least one second station. During the uplink data transmission performed by the at least one first station, the second station receives the second trigger frame sent by the second access point. The at least one second station sends an uplink frame to the second access point based on the second trigger frame. Through coordination between access points APs, the second station may send uplink data to the second access point in a time period in which the at least one first station associated with the first access point performs the uplink data transmission, thereby improving transmission efficiency.

In a possible implementation, the radio frame further includes a spatial reuse parameter SRP. The spatial reuse parameter is used by the second access point to determine a transmit power for a downlink frame, and the spatial reuse parameter is further used by the at least one second station to determine a first maximum transmit power of the at least one second station. Herein, the first maximum transmit power=the spatial reuse parameter−a receive power that is measured by the at least one second station for the radio frame. The second access point AP 2 or the at least one second station may determine an appropriate transmit power based on the spatial reuse parameter, to avoid excessive interference caused to the second access point AP 2 by the frame sent by the second access point or the second station during the uplink data transmission performed by the first access point.

In a possible implementation, the second trigger frame further includes a transmit power at which the second access point sends the second trigger frame, and a target receive power of the second access point. The transmit power at which the second access point sends the second trigger frame is used by the at least one second station to determine a second maximum transmit power of the at least one second station. Herein, the second maximum transmit power=the target receive power of the second access point AP+the transmit power at which the second access point sends the second trigger frame−a receive power that is measured by the second station for the second trigger frame.

In a possible implementation, when the first maximum transmit power is greater than or equal to the second maximum transmit power, that the second station sends the uplink frame to the second access point includes: The second station sends the uplink frame to the second access point by using the second maximum transmit power. The transmit power of the second station is controlled by using the SRP parameter, so that the second station ensures that the sent uplink frame can be successfully received by the second access point AP without affecting data receiving performed by the first access point AP. When the first maximum transmit power is less than the second maximum transmit power, that the second station sends the uplink frame to the second access point includes: The second station sends the uplink frame to the second access point by using the first maximum transmit power.

In a possible implementation, when the second maximum transmit power is greater than the first maximum transmit power, the second trigger frame further includes a transmission indication. The transmission indication is used to indicate whether the at least one second station sends the uplink frame when the second maximum transmit power is greater than the first maximum transmit power.

In a possible implementation, the second trigger frame further includes a transmission indication. The transmission indication is used to indicate a preset value. When a difference obtained by subtracting the first maximum transmit power from the second maximum transmit power is greater than or equal to the preset value, the at least one second station sends the uplink frame. When a difference obtained by subtracting the first maximum transmit power from the second maximum transmit power is less than the preset value, the at least one second station does not send the uplink frame.

According to a sixth aspect, a spatial reuse apparatus on a first access point side is provided. The apparatus may be a first access point device, or may be a chip in a first access point. The apparatus has a function for implementing the first access point in the foregoing second aspect or the fourth aspect. The function may be implemented by using hardware, or may be implemented by executing corresponding software by hardware. The hardware or the software includes one or more units corresponding to the foregoing function.

In a possible implementation, when the apparatus is the first access point, the first access point includes a processor and a transceiver. The processor is configured to support the first access point AP in performing corresponding functions in the foregoing methods. The transceiver is configured to: indicate communication between the first access point AP and a second access point AP, and send related information or a related instruction in the foregoing methods to the second access point. Optionally, the first access point may further include a memory. The memory is configured to be coupled to the processor. The memory stores a necessary program instruction and necessary data of the first access point.

In a possible implementation, when the apparatus is the chip in the first access point, the chip includes a processing module and a transceiver module. For example, the processing module may be a processor. The processor is configured to: generate a radio frame, and perform processing such as encoding, modulation, and amplification on the radio frame. The transceiver module may be, for example, an input/output interface, a pin, or a circuit on the chip. The processing unit may execute a computer execution instruction stored in a storage unit, to support the first access point AP in implementing corresponding functions in the foregoing methods. Optionally, the storage unit may be a storage unit in the chip, for example, a register or a buffer. The storage unit may be alternatively a storage unit located outside the chip and in the first access point, for example, a read-only memory (ROM), or a static storage device in another type that can store static information and an instruction, or a random access memory (RAM).

In a possible implementation, the apparatus includes a processor and a modem. The processor may execute an instruction or may use operating system, to implement control on functions of the first access point. The modem may perform encapsulation, encoding and decoding, modulation and demodulation, equalization, and the like on data according to a protocol, to generate a radio frame, thereby supporting the first access point AP in performing the corresponding functions in the method in the second aspect or the fourth aspect.

In a possible implementation, the apparatus includes a processor, a baseband circuit, a radio frequency circuit, and an antenna. The processor is configured to implement control on some functions of each circuit. The baseband circuit is configured to: generate a radio frame including identification information, perform processing such as analog conversion, filtering, amplification, and up-conversion on the radio frame by using the radio frequency circuit, and send the processed radio frame to the second access point AP by using the antenna. Optionally, the apparatus further includes a memory. The memory stores a necessary program instruction and necessary data of the first access point.

Any processor mentioned above may be a general purpose central processing unit (CPU), a microprocessor, an application-specific integrated circuit (ASIC), or one or more integrated circuits that are configured to control program execution of the spatial reuse methods in the foregoing aspects.

According to a seventh aspect, this application provides a spatial reuse apparatus on a second access point side. The apparatus may be a second access point device, or may be a chip in a second access point. The apparatus has a function for implementing the second access point in the foregoing first aspect or the third aspect. The function may be implemented by using hardware, or may be implemented by executing corresponding software by hardware. The hardware or the software includes one or more units corresponding to the foregoing function.

In a possible implementation, when the apparatus is the second access point, the second access point includes a processor and a transceiver. The processor is configured to support the second access point AP in performing corresponding functions in the foregoing methods. The transceiver is configured to: indicate communication between the second access point AP and a first access point AP or a station, and send related information or a related instruction in the foregoing methods to the second access point; or send a trigger frame to a station to trigger the station to perform uplink transmission. Optionally, the second access point may further include a memory. The memory is configured to be coupled to the processor. The memory stores a necessary program instruction and necessary data of the second access point.

In a possible implementation, when the apparatus is the chip in the second access point, the chip includes a processing module and a transceiver module. For example, the processing module may be, a processor. The processor may be configured to perform processing such as filtering, demodulation, power amplification, and decoding on a radio frame received by using the transceiver module. The transceiver module may be, for example, an input/output interface, a pin, or a circuit on the chip. The processing unit may execute a computer execution instruction stored in a storage unit, to support the second access point AP in implementing corresponding functions in the foregoing methods. Optionally, the storage unit may be a storage unit in the chip, for example, a register or a buffer. The storage unit may be alternatively a storage unit located outside the chip and in the second access point, for example, a read-only memory (ROM), or a static storage device in another type that can store static information and an instruction, or a random access memory (RAM).

In a possible implementation, the apparatus includes a processor and a modem. The processor may be applied to an instruction or operating system, to implement control on functions of the second access point. The modem may perform encapsulation, encoding and decoding, modulation and demodulation, equalization, and the like on data according to a protocol, to generate a downlink frame, thereby supporting the second access point AP in performing corresponding functions in the method in the first aspect or the third aspect.

In a possible implementation, the apparatus includes a processor, a baseband circuit, a radio frequency circuit, and an antenna. The processor is configured to implement control on some functions of each circuit. The radio frequency circuit may perform processing such as digital conversion, filtering, amplification, and down-conversion on a radio frame that is sent by the first access point and that is received by using the antenna, and then obtain signaling information after decoding performed by using the baseband circuit. Optionally, the apparatus further includes a memory. The memory stores a necessary program instruction and necessary data of the second access point.

Any processor mentioned above may be a general purpose central processing unit (CPU), a microprocessor, an application-specific integrated circuit (ASIC), or one or more integrated circuits that are configured to control program execution of the spatial reuse methods in the foregoing aspects.

According to an eighth aspect, this application provides a computer-readable storage medium. The computer-readable storage medium stores an instruction. The instruction may be executed by one or more processors in a processing circuit. When the instruction is run on a computer, the computer is enabled to perform the method in any one of the foregoing first aspect to the fifth aspect or any possible implementation of these aspects.

According to a ninth aspect, a processor is provided. The processor is configured to be coupled to a memory, and is configured to perform the method in any one of the foregoing first aspect to the fifth aspect or any possible implementation of these aspects.

According to a tenth aspect, a computer program product including an instruction is provided. When the computer program product is run on a computer, the computer is enabled to perform the method in any one of the foregoing first aspect to the fifth aspect or any possible implementation of these aspects.

According to another aspect, this application provides a chip system. The chip system includes a processor, configured to support a data sending device in implementing functions in the foregoing aspects, for example, generating or processing data and/or information in the foregoing methods. In a possible design, the chip system further includes a memory. The memory is configured to store a program instruction and data that are necessary for the data sending device. The chip system may include a chip, or may include a chip and another discrete device.

According to another aspect, an embodiment of this application provides a wireless communications system. The system includes the first access point and the second access point in the foregoing aspects.

In the technical solutions in this application, through coordination between access points APs, a transmission time in an SRP transmission opportunity is fully used, thereby reducing a transmission time loss and a transmission conflict and improving transmission efficiency.

DESCRIPTION OF EMBODIMENTS

Terms used in implementations of this application are merely used to explain specific embodiments of this application, but are not intended to limit this application.

Figure 1:
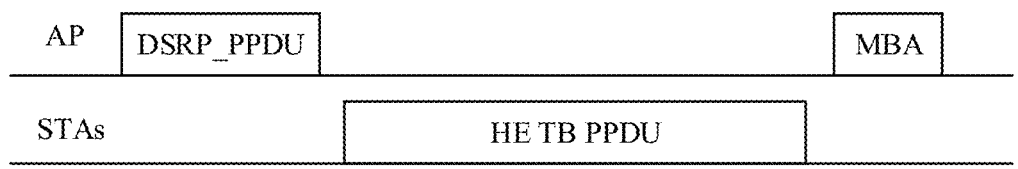
FIG. 1 is a schematic diagram of a time sequence in existing spatial reuse transmission.

In the 802.11ax standard, an uplink multi-user transmission procedure based on a trigger from an AP is defined. The procedure includes: (1) An AP sends a trigger frame. (2) A STA sends a high-efficiency trigger based physical layer protocol data unit (HE TB PPDU). (3) The AP sends an acknowledgment frame. The trigger frame may be aggregated with another frame (for example, a data frame) to be referred to as a delayed spatial reuse parameter physical layer protocol data unit (DSRP_PPDU (for transmission). A specific transmission procedure is shown in FIG. 1.

Both the DSRP_PPDU and the HE TB PPDU include a spatial reuse parameter (SRP). The SRP is used by another node to perform power control during spatial reuse SR transmission. A specific power control method is as follows: First, a node receives a DSRP_PPDU, and measures a received signal power, RSSI (RSSI) of the DSRP_PPDU. Then, the node obtains an SRP from the DSRP_PPDU or an HE TB PPDU. Based on a receive power for the DSRP_PPDU and the SRP, the node may obtain a maximum transmit power Pmax=SRP−RSSI of the node through calculation. When the node performs transmission in a transmission time period of the HE TB PPDU, if a transmit power of the node does not exceed Pmax, it can be ensured that transmission performed by the node does not cause excessive interference to receiving performed by an AP. This is because the SRP is determined by the AP and carried in the DSRP_PPDU, and the AP considers an interference value bearable to the AP when determining a value of the SRP. A maximum interference value Pmax−path_loss bearable to the AP may be obtained through calculation based on the maximum transmit power of the node. Herein, path_loss is a path loss from an interference source to the AP, and the maximum interference value is Imax=Pmax−path_loss=SRP−RSSI−path_loss=SR—$P_{AP}$, where $P_{AP}$ is a transmit power of the AP. The AP may obtain the value of the SRP based on the maximum interference value bearable to the AP. When another node performs SR transmission and a transmit power of the another node is less than Pmax, it can be ensured that the transmission performed by the another node does not cause excessive interference to receiving performed by the AP.

A specific SRP-based SR transmission procedure is as follows: A node performs channel contention, receives a DSRP_PPDU in a channel contention process, measures a receive power RSSI of the DSRP_PPDU, and obtains an SRP from the DSRP_PPDU or an HE TB PPDU. In the channel contention process, the node may ignore a busy state of a channel caused due to the DSRP_PPDU or the HE TB PPDU. When the node successfully contends for the channel, the node may perform transmission in a transmission time period of the HE TB PPDU, and meet a condition that a transmit power of the node does not exceed Pmax=SRP−RSSI.

In addition, it should be noted that, when the node receives a DSRP_PPDU from another cell, and a transmit power for the DSRP_PPDU does not exceed Pmax=SRP−RSSI, it is also considered that the node identifies an SRP transmission opportunity.

However, after the node identifies the SRP transmission opportunity, channel contention still needs to be performed. Therefore, a part of a transmission time is lost due to the channel contention performed by the node. In addition, any node may identify an SRP transmission opportunity. If a plurality of nodes successfully contend for a channel at a same time, simultaneous transmission may cause a transmission conflict, thereby causing a transmission failure.

In a transmission method based on multi-access point AP coordination provided in the embodiments of this application, through coordination between access points APs, when SRP transmission needs to be performed, an access point may configure an SRP transmission opportunity for another specific node for data transmission, thereby making full use of a transmission time in the SRP transmission opportunity and reducing a transmission time loss and a transmission conflict in SR reuse. In addition, inter-cell interference is reduced, quality of service for a user is improved, and transmission efficiency is improved.

Figure 2:
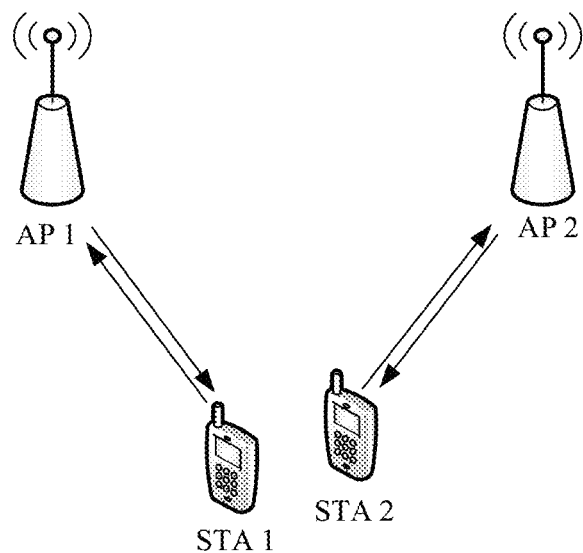
FIG. 2 shows an example application scenario according to an embodiment of this application.

It should be understood that, the technical solutions of the embodiments of this application may be applied to various communications systems, for example, a global system for mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5G communications system. For ease of description, an embodiment of this application is described by using an example application scenario shown in FIG. 2 as an example. A communications system shown in FIG. 2 includes a first access point AP 1, a first station STA 1 associated with the AP 1, a second access point AP 2, and a second station STA 2 associated with the AP 2. A quantity of access points APs and a quantity of stations in the communications system 200 are merely an example, and does not constitute a limitation on this embodiment of this application.

A person skilled in the art may understand that, in the foregoing communications system 200, the STA 1 and the STA 2 in this application may be various user terminals, user apparatuses, access apparatuses, subscriber stations, subscriber units, mobile stations, user agents, user equipment, or the like in another name that have a wireless communication function. The user terminal may include various handheld devices, vehicle-mounted devices, wearable devices, computing devices, or other processing devices connected to a wireless modem that have a wireless communication function; and various forms of user equipment (UE), mobile stations (MS), terminals, terminal equipment, portable communications devices, handheld devices, portable computing devices, entertainment devices, game devices or systems, global positioning system devices or any other appropriate devices configured to perform network communication by using a wireless medium, and the like. Herein, for ease of description, the devices mentioned above are collectively referred to as a station or a STA.

The AP 1 and the AP 2 in this application are apparatuses that are deployed in a wireless communications network and that provide a wireless communication function for the station STA 1 or the station STA 2. The access point AP may be used as a hub of the communications system. The access point AP may be a base station, a router, a gateway, a repeater, a communications server, a switch, a bridge, or the like. The base station may include various forms of macro base stations, micro base stations, relay stations, and the like.

The following describes the technical solutions of the embodiments in this application with reference to the accompanying drawings. It should be noted that a first access point in the following embodiments may be the AP 1 in FIG. 2, a second access point may be the AP 2 in FIG. 2, a first station may be the STA 1 in FIG. 2, and a second station may be the STA 2 in FIG. 2.

Figure 3:
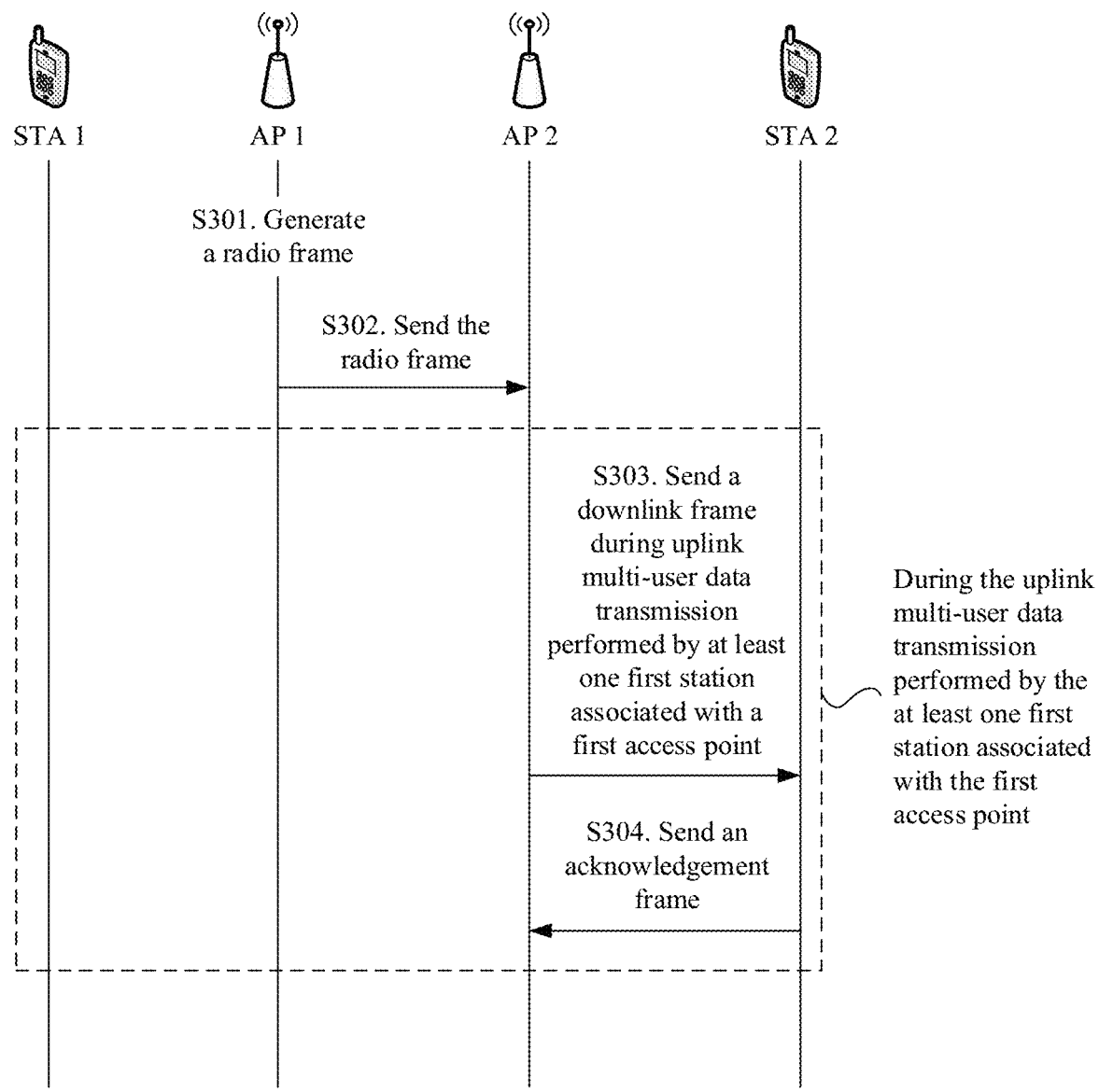
FIG. 3 is a schematic flowchart of a spatial reuse method according to an embodiment of this application.

FIG. 3 is a schematic interaction diagram of a spatial reuse method according to an embodiment of this application. In the method, a second access point AP performs downlink data transmission. The method includes the following steps:

S301. A first access point generates a radio frame.

In step S301, the radio frame includes identification information. The identification information is used to indicate a second access point to perform spatial reuse transmission during uplink data transmission performed by at least one first station associated with the first access point. The identification information may be an identifier (ID) of the second access point AP, or may be a media access control (MAC) address of the second access point, or may be an association identifier (AID) of the second access point.

In an example, the radio frame is a first trigger frame, a user information field in the first trigger frame includes an association identifier field, and the identification information may be carried in the association identifier field. For example, the first trigger frame includes three user information fields, and an association identifier in one of the user information fields carries the identification information. A value of the association identifier may be a special value, or may be a 12-bit ID determined after negotiation between the first AP and the second AP. After receiving the first trigger frame, the second AP may determine, based on the association identifier field, that the second AP is scheduled by the first AP.

In another example, the radio frame is a first trigger frame, the first trigger frame includes a resource unit allocation field, and the resource unit allocation field may carry the identification information. For example, the first trigger frame includes a plurality of resource unit allocation fields, and one of the resource unit allocation fields is used to carry the identification information. A value of the resource unit allocation field may be a special value to indicate the identification information and to indicate the second AP to perform spatial reuse transmission during the uplink data transmission performed by the at least one first station associated with the first access point.

The association identifier field or the resource unit allocation field is used as a reuse indication. No additional bit needs to be added to carry the identification information, thereby reducing signaling overheads.

In still another example, the second access point is a fronthaul AP of a second multi-AP device, the first access point AP is a fronthaul AP of a first multi-AP device, and the first multi-AP device is a parent node of the second multi-AP device. When at least one second station associated with the second access point AP is a backhaul STA included in the second multi-AP device, and the backhaul STA is associated with the first access point, the identification information may be an association identifier AID of the backhaul STA.

Optionally, the radio frame may further include a spatial reuse parameter SRP. The spatial reuse parameter is used by the second access point to determine a transmit power for a downlink frame. The second access point AP 2 may determine an appropriate transmit power based on the spatial reuse parameter, to avoid excessive interference caused to the first access point AP 1 by the downlink frame sent by the second station during the uplink data transmission performed by the at least one first station.

Optionally, the radio frame may further include resource allocation information. The resource allocation information indicates a specific resource unit allocated by the first access point to the second access point to perform spatial reuse transmission. In other words, after receiving the radio frame, the second access point may send the downlink frame to the at least one second station on the resource unit indicated by the resource allocation information. The resource unit may be a time domain resource unit, a frequency domain resource unit, or a time-frequency resource unit.

Optionally, the radio frame may further includes an uplink/a downlink transmission indication to indicate whether the second AP performs uplink transmission or downlink transmission after receiving the radio frame, so that the first AP can control a transmission direction of the second AP.

S302. The first access point sends the radio frame to the second access point.

In step S302, the radio frame is used to trigger the second access point to perform spatial reuse during the uplink data transmission performed by the at least one first station associated with the first access point, to send the downlink frame to the at least one second station. The at least one second station may be a station associated with the second access point.

It should be noted that "during uplink data transmission performed by at least one first station associated with the first access point" may indicate a time interval in which the first access point receives an uplink data packet sent by the at least one first station associated with the first access point. The time interval may be a time range between a start moment and an end moment of sending the uplink data packet by the at least one first station associated with the first access point. In addition, it may be understood that information used to indicate duration of the uplink data transmission performed by the at least one first station may be carried in the radio frame sent by the first access point AP, for example, a trigger frame; or may be carried in another frame. In this way, after obtaining an SRP transmission opportunity specified by the first AP, the second access point may perform data transmission during the uplink data transmission performed by the at least one first station associated with the first access point.

It may be understood that a MAC frame included in a data field of the uplink data packet may be a data frame, or may be a frame in another type.

S303. The second access point sends the downlink frame during the uplink data transmission performed by the at least one first station associated with the first access point.

In step S303, the second access point receives the radio frame, and determines, based on the identification information in the radio frame, that the first access point configures the SRP transmission opportunity for the second access point to perform data transmission. The second access point performs spatial reuse and sends the downlink frame to the at least one second station associated with the second access point, during the uplink data transmission performed by the at least one first station associated with the first access point.

The second access point may calculate, based on the spatial reuse parameter SRP carried in the radio frame, a maximum transmit power of the second access point to obtain that $P_{MAX1}=SRP-RSSI_1$. Herein, $RSSI_1$ is a receive power at which the second access point receives the radio frame sent by the first access point.

The second station may alternatively calculate, based on the spatial reuse parameter SRP carried in the radio frame, a maximum transmit power of the second station to obtain that $P_{MAX2}=SRP-RSSI_2$. Herein, $RSSI_2$ is a receive power at which the second station receives the radio frame sent by the first access point.

Optionally, the downlink frame sent by the second access point may further carry the SRP. In this way, when the second station cannot obtain the SRP due to a failure in normally receiving the radio frame sent by the first access point, the second station can still obtain the SRP from the downlink frame sent by the second access point, thereby improving robustness. Optionally, the spatial reuse parameter SRP may be carried in a high-efficiency variant field of a high-throughput control field (HE variant of HT control) of the downlink frame.

The second access point receives the radio frame. After a predefined time interval, the second access point sends the downlink frame to the at least one second station during the uplink data transmission performed by the at least one first station. The at least one second station may be a station associated with the second access point. The time interval may be short interframe space SIFS.

It should be noted that before the second access point sends the downlink frame, the first access point may further notify the second access point of information about the time interval in which the first access point performs the uplink data transmission, so that the second access point determines the duration of the uplink data transmission performed by the first access point. In an example, the time interval information and the identification information of the second access point may be both carried in the radio frame. In another example, the time interval information may be alternatively separately carried in another frame. The time interval information may be a start moment from which the first access point performs the uplink data transmission and transmission duration; or may be a start moment and an end moment of performing the uplink data transmission by the first access point.

It may be understood that, optionally, after the at least one station successfully receives the downlink frame sent by the second access point, the method further includes S304: The at least one second station sends an acknowledgment frame to the second access point.

In step S304, the at least one second station needs to send the acknowledgment frame to the second access point during the uplink data transmission performed by the first access point.

It may be understood that step S303 and step S304 may be performed for a plurality of times during the uplink data transmission performed by the first access point.

Figure 4:
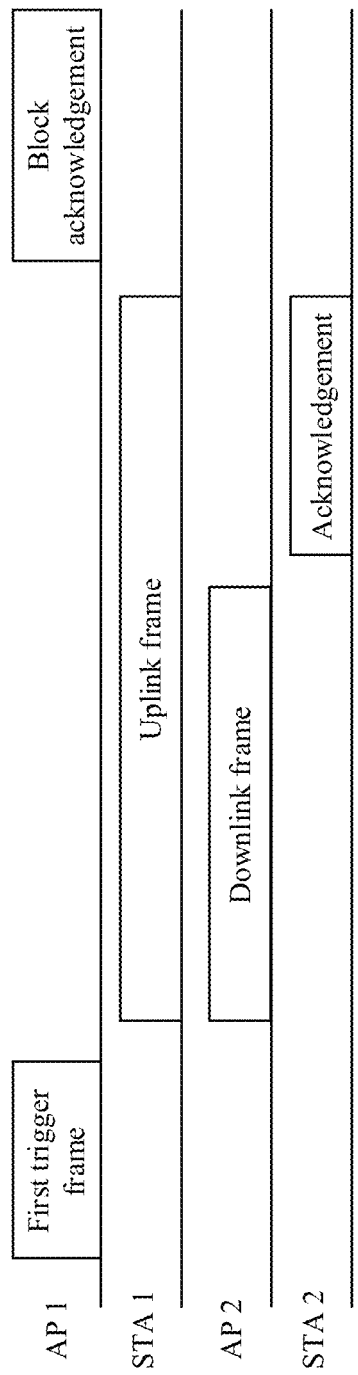
FIG. 4 is a schematic diagram of a time sequence in a spatial reuse method according to an embodiment of this application.

In an example, the radio frame shown in FIG. 3 is the first trigger frame. FIG. 4 shows a specific example of this embodiment of this application. The first trigger frame may be further used to trigger the at least one first station associated with the first access point to perform the uplink data transmission.

Figure 5:
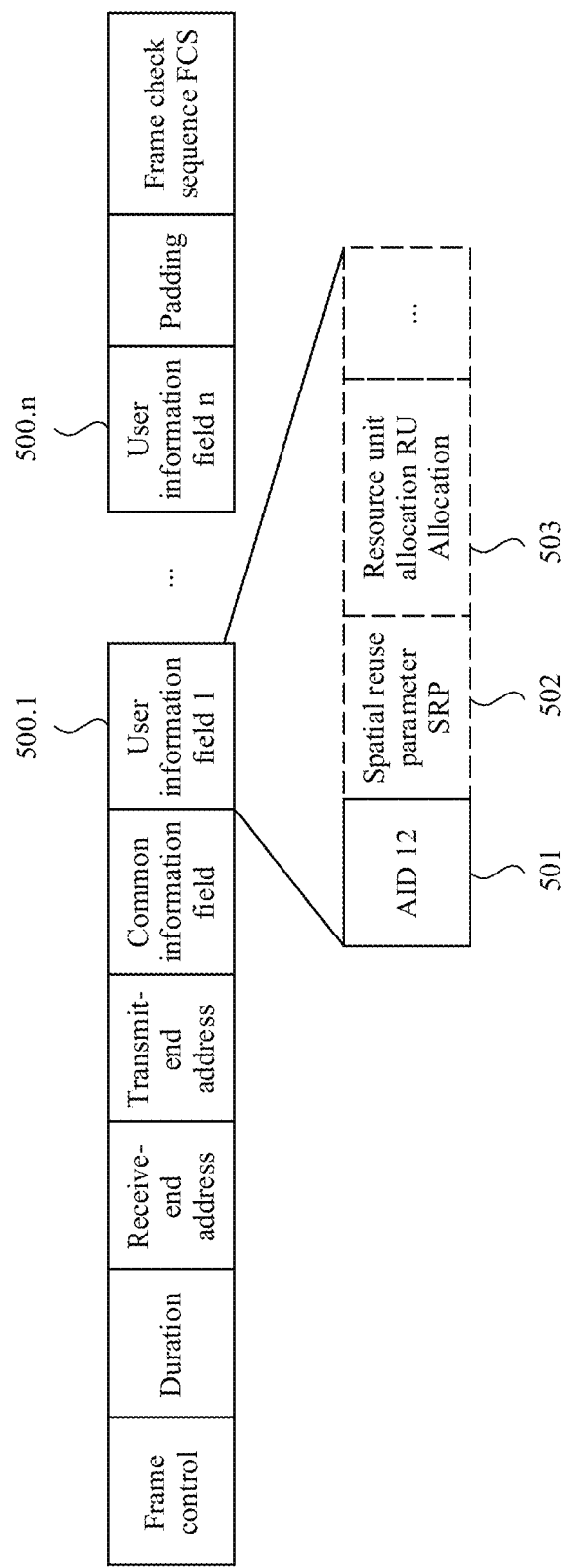
FIG. 5 is a schematic diagram of a frame structure of a trigger frame according to an embodiment of this application.

A frame structure of the first trigger frame may be shown in FIG. 5. The first trigger frame includes a common information field and at least one user information field. The common information field includes common information sent to all users. Each user information field includes information sent to a specific user.

One of the at least one user information field included in the first trigger frame may be used to carry control information of the second access point AP, and is a user information field of the second AP. Other user information fields may be used to carry control information of one or more first stations. Because the first station performs the uplink transmission based on the trigger frame, and the AP 2 performs spatial reuse transmission, control information required by the first station is different from that required by the AP 2.

In an example, the identification information may be carried in an association identifier field in the user information field of the second AP. The identification information may be an association identifier of the second access point. The association identifier may be a 12-bit ID determined after negotiation between the first AP and the second AP. In FIG. 5, that a first user information field is the user information field of the second access point AP is used as an example for description. The user information field of the second access point AP may include identification information 501. The identification information may be a 12-bit ID determined after negotiation between the first AP and the second AP. Optionally, the user information field of the second access point AP may further include a spatial reuse parameter SRP 502 and resource allocation information 503.

Figure 6:
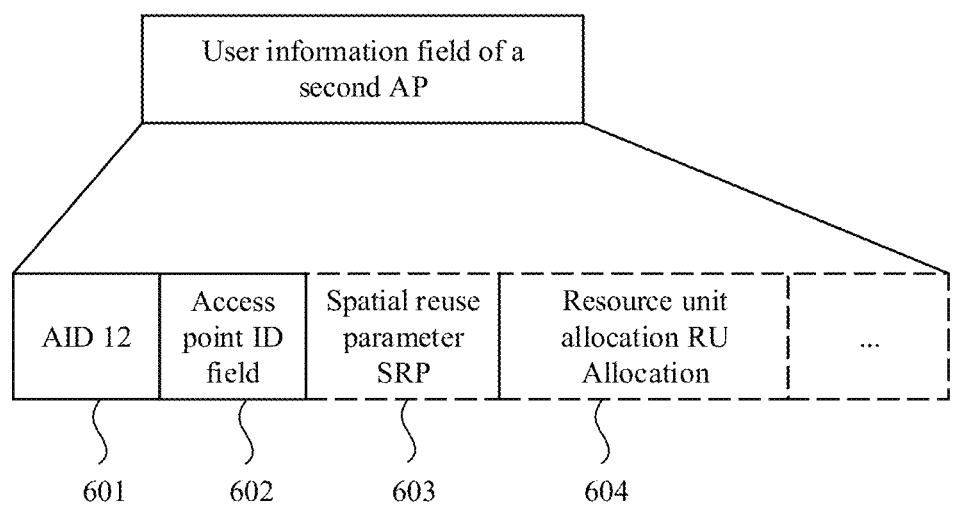
FIG. 6 is a schematic structural diagram of a user information field of a second AP in a trigger frame according to an embodiment of this application.

In another example, a structure of the user information field of the second AP may be shown in FIG. 6. The user information field includes an association identifier AID field 601 and an access point ID field 602. Optionally, the user information field further includes an SRP 603 and a resource allocation information field 604. The identification information may be carried in the access point ID field 602. A value of the AID field 601 is a special AID value to indicate that the user information field is a special user information field. The user information field is used to carry the control information of the second AP. The special AID value may be any value from 2007 to 2044, for example, 2044. It may be understood that, after receiving the first trigger frame, the second AP may learn, based on the special AID field in the user information field, that the user information field is the user information field of the second AP, and further read an access point ID field after the AID field 601 to determine whether the user information field is the control information of the second AP.

In still another example, a multi-AP device includes a fronthaul AP and a backhaul STA. The second AP is a fronthaul AP in a second multi-AP device, and the first AP is a fronthaul AP in a first multi-AP device. The first multi-AP device is a parent node of the second multi-AP device, and the second AP is associated with the first AP. That the second AP is associated with the first AP means that a backhaul station STA in the second multi-AP device in which the second AP is located is associated with the first access point AP, that is, the second station is associated with the first access point AP. In this case, the identification information may be an AID of the backhaul STA in the second multi-AP device in which the second AP is located. Therefore, when the first AP sends the radio frame including the identification information, the backhaul STA of the second multi-AP device may transfer information to the fronthaul AP in the second multi-AP device, that is, the second AP, by using an internal circuit.

To avoid ambiguity, the user information field of the first trigger frame may further include indication information. The indication information may be used to indicate that the first trigger frame is used to indicate whether to trigger the backhaul STA that is in the second multi-AP device and that corresponds to the user information field to perform uplink data transmission, or trigger the fronthaul AP (that is, the second AP) that is in the second multi-AP device and that corresponds to the user information field to perform reuse transmission. In this way, the following case is avoided: When the identification information is the AID of the backhaul STA, there may be an ambiguity problem in determining whether to trigger the backhaul STA in the second multi-AP device to perform multi-user transmission based on the trigger frame, or trigger the fronthaul AP (the second AP) in the second multi-AP device to perform spatial reuse transmission. In an implementation, the indication information may be located in a reserved bit in the user information field. In another implementation, the indication information may be further carried by using special values of some fields in the user information field. For example, the user information field includes a resource unit allocation field, and values that are indicated by bits 19 to 13 in the resource unit allocation field and that are in a value range from 69 to 127 are reserved values. Therefore, the indication information may be a resource unit allocation field, and the resource unit allocation field may be set to a specific value (for example, 127) in 69 to 127 to indicate that the first trigger frame is used to trigger the second AP (the fronthaul AP) to perform spatial reuse transmission instead of being used to trigger the backhaul STA to perform data transmission based on the trigger frame. When values indicated by bits 19 to bit 13 in the RU allocation field are in a range from 0 to 68, it indicates that the first trigger frame is used to trigger the backhaul STA to perform data transmission based on the first trigger frame.

Similar to step S303 in the foregoing, the first trigger frame carries the spatial reuse parameter SRP for the second access point, so that the second access point sets a transmit power of the second access point when sending data. The second access point may calculate a maximum transmit power of the second access point to obtain that $P_{MAX1}=SRP-RSSI_1$. Herein, $RSSI_1$ is a receive power at which the second access point receives the radio frame sent by the first access point. The second station may alternatively calculate, based on the spatial reuse parameter SRP carried in the radio frame, a maximum transmit power of the second station to obtain that $P_{MAX2}=SRP-RSSI_2$. Herein, $RSSI_2$ is a receive power at which the second station receives the radio frame sent by the first access point.

Figure 7:
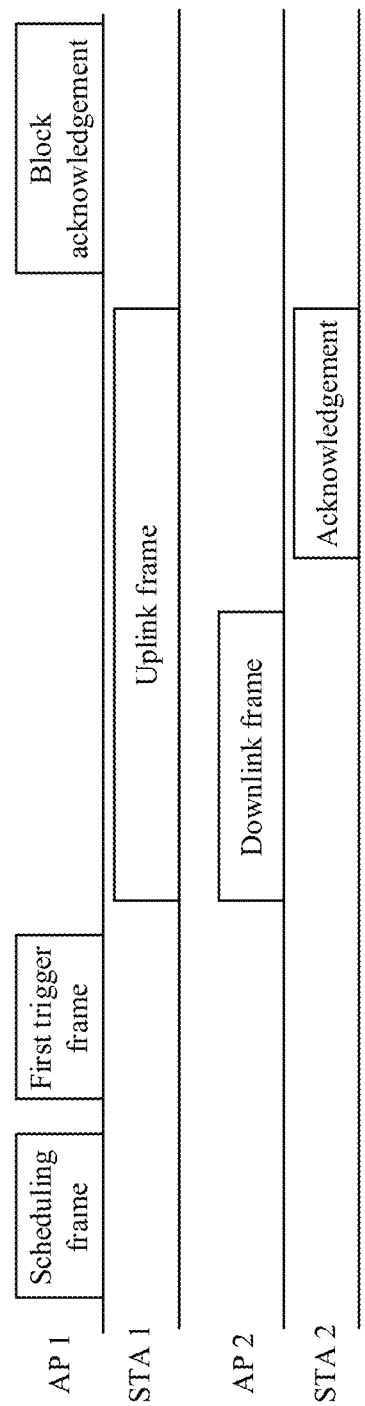
FIG. 7 is a schematic diagram of a time sequence in another spatial reuse method according to an embodiment of this application.

FIG. 7 shows another specific example. The control information for the spatial reuse transmission performed by the second access point AP may be carried in another frame different from the first trigger frame, which is different from the example in FIG. 4. The another frame may be referred to as a scheduling frame. In other words, in this embodiment of this application, the first AP may first send, to the second AP, the control information used by the second AP to perform reuse transmission, and then perform uplink data transmission. Specifically, the scheduling frame includes the identification information. Optionally, the scheduling frame may further include the spatial reuse parameter SRP and the resource allocation information. The control information for the spatial reuse transmission is separated from the trigger frame, thereby avoiding adjustment and modification to an existing trigger frame structure, to achieve better compatibility.

It should be noted that the scheduling frame may also be referred to as a control frame, a configuration frame, a synchronization frame, or the like. A name of the scheduling frame is not specifically limited in this embodiment of this application.

In the method provided in this embodiment of this application, through coordination between a plurality of APs, the first AP may configure an SRP transmission opportunity for another specific AP (the second AP) for downlink transmission, thereby making full use of a transmission time in the SRP transmission opportunity and improving transmission efficiency.

Figure 8:
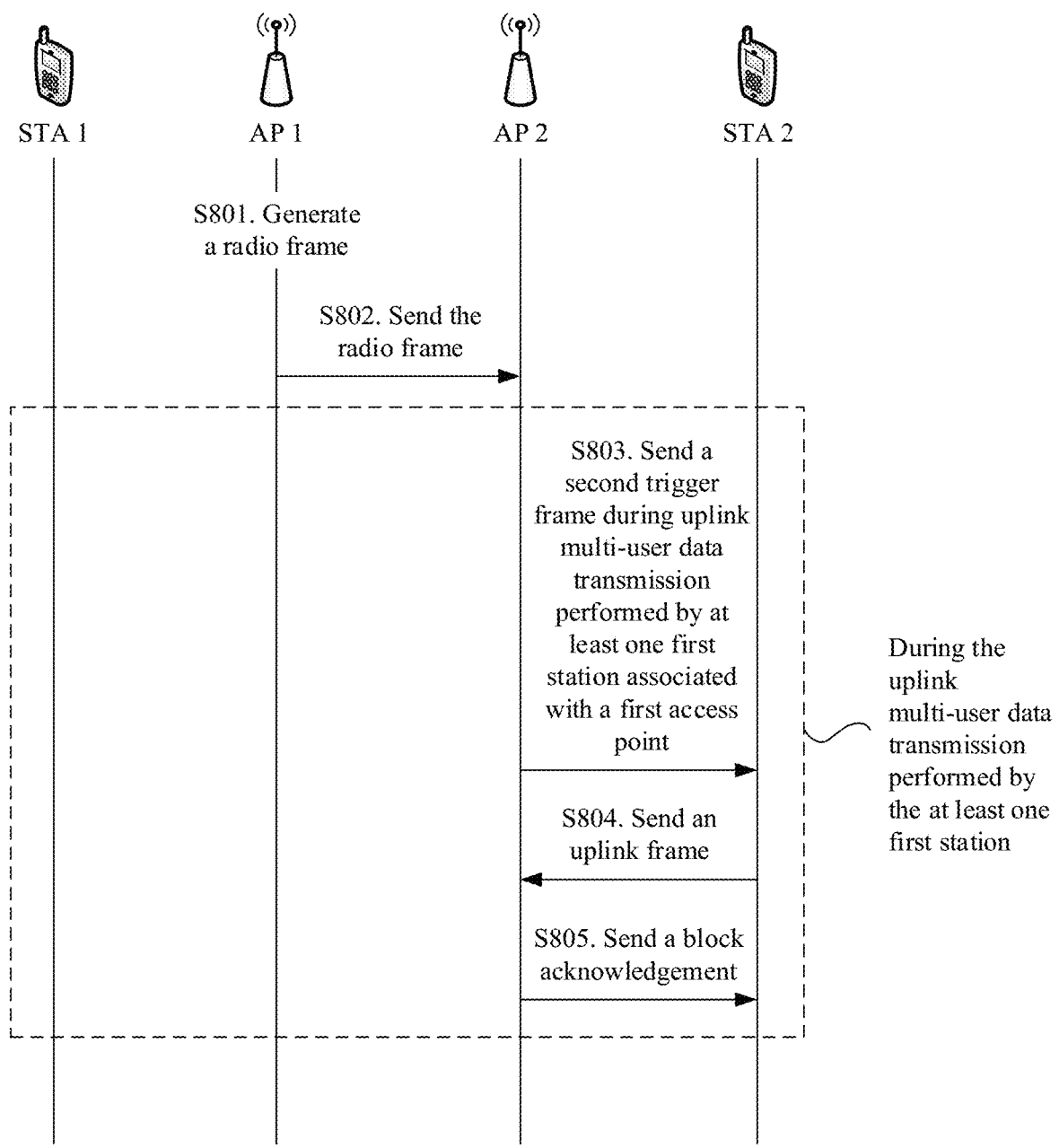
FIG. 8 is a schematic flowchart of another spatial reuse method according to an embodiment of this application.

FIG. 8 is a schematic interaction diagram of another spatial reuse method according to an embodiment of this application. A second access point AP in this embodiment of this application triggers, during uplink data transmission performed by at least one first station associated with a first access point, a second station associated with a second access point to perform uplink data transmission, which is different from the foregoing embodiment. The method includes the following steps:

S801. The first access point generates a radio frame.

Step S801 is similar to step S301. Details are not described herein again.

S802. The first access point sends the radio frame to the second access point.

Step S802 is similar to step S302. Details are not described herein again.

S803. The second access point sends a second trigger frame to the at least one second station based on identification information during the uplink data transmission performed by the at least one first station associated with the first access point.

In step S803, the second access point receives the radio frame sent by the first access point, and the second AP determines, based on the identification information included in the radio frame, that the first access point configures an SRP transmission opportunity for the second access point to perform data transmission. The second access point performs spatial reuse and sends the second trigger frame to the at least one second station, during the uplink data transmission performed by the at least one first station associated with the first access point.

Optionally, the second access point may calculate, based on a spatial reuse parameter SRP carried in the radio frame, a maximum transmit power of the second access point to obtain that $P_{MAX1}=SRP-RSSI_A$, which is similar to step S303. Herein, RSSI A is a receive power at which the second access point receives the radio frame sent by the first access point.

The second access point AP determines, based on the calculated maximum transmit power $P_{MAX1}$, a power $P_{Trigger2}$ for sending the second trigger frame. Optionally, the second trigger frame may further include a power for sending the second trigger frame by the second AP and a target receive power target_RSSI of the second AP, so that the second station can set an appropriate transmit power to send an uplink frame. The target receive power is an expected received signal power of the second AP. In an example, the target receive power is a power at which the second AP can successfully parse the uplink frame sent by the STA. The second station may alternatively calculate a first maximum transmit power of the second station based on a spatial reuse parameter SRP to obtain that $PW_1=SRP-RSSI_{S1}$. Herein, RSSI si is a receive power at which the second station receives the radio frame sent by the first access point, and the first maximum transmit power $PW_1$ is a maximum transmit power value that ensures that sending performed by the second station does not affect receiving performed by the first AP. The second station may further calculate a second maximum transmit power of the second station based on the power $P_{Trigger2}$ at which the second AP sends the second trigger frame and a target receive power target_RSSI of the second AP, to obtain that $PW_2=target\_RSSI+P_{Trigger2}-RSSI_{S2}$. Herein, $RSSI_{S2}$ is a receive power that is measured by the second station for the second trigger frame, and the second maximum transmit power $PW_2$ is a transmit power value that helps the second AP successfully receive the uplink frame sent by the second station.

When the first maximum transmit power $PW_1$ is greater than or equal to the second maximum transmit power $PW_2$, the method may further include S804: The second station sends an uplink frame to the second AP. In step S804, the second station sends the uplink frame to the second AP by using the second maximum transmit power $PW_2$ during the uplink data transmission performed by the at least one first station associated with the first access point, so that the second station ensures that the uplink frame sent by the second station is successfully received by the second AP and no excessive interference is caused to receiving performed by the AP 1.

When the first maximum transmit power $PW_1$ is less than the second maximum transmit power $PW_2$, in the first processing manner, the second station abandons this time of transmission opportunity, and does not send the uplink frame to the second access point AP.

In a second processing manner, the second station does not abandon the transmission opportunity herein, and sends the uplink frame to the second AP by using the first maximum transmit power $PW_1$.

In a third processing manner, the second AP carries transmission indication information by the sent second trigger frame. In an example, the transmission indication information is used to indicate whether the at least one second station sends the uplink frame when the first maximum transmit power $PW_1$ is less than the second maximum transmit power $PW_2$. The transmission indication may be a 1-bit indication bit. For example, when a value of the transmission indication is 0, it may indicate that the second station does not send the uplink frame when $PW_2>PW_1$. When a value of the transmission indication is 1, it may indicate that the second station sends the uplink frame by using the transmit power $PW_1$ when $PW\ 2>PW_1$. In another example, the transmission indication information may be alternatively a threshold value T used to indicate that the second station sends the uplink frame by using the transmit power $PW_1$ when $PW_2-PW_1>T$, and the second station does not send the uplink frame when $PW_2-PW\ 1\leq T$.

Optionally, in a processing manner of $PW_2-PW\ 1\leq T$, the second station may further carries a transmit power headroom $PW_1-PW_2$ by the sent uplink frame, so that the second AP adjusts a parameter setting in a subsequent trigger, for example, appropriately reduces a modulation and coding scheme (MCS) of the second STA.

Optionally, the second trigger frame sent by the second access point may also carry the SRP. In this way, when the second station cannot obtain the SRP because the second station does not normally receive the radio frame sent by the first access point, the second station can still obtain the SRP from the uplink frame sent by the second access point, thereby improving robustness.

Optionally, after the second AP receives the uplink frame sent by the second station, the method may further include S805: The second access point sends acknowledgment information to the second station. The acknowledgment information may be a multi-user block acknowledgment (MBA).

It may be understood that, similar to downlink, steps S803, S804, and S805 should end within a time range of an HE TB PPDU, to ensure that sending of the uplink frame and the acknowledgment frame interferes only with receiving performed by the AP 1 but does not interfere with other transmission. It may be understood that steps S803, S804, and S805 may be performed for a plurality of times within the time range in which the first access point performs uplink data transmission, provided that the execution does not exceed the time range in which the first access point performs the uplink data transmission.

Optionally, the second trigger frame may further carry SR transmission indication information, to indicate to the second station whether the to-be-performed uplink transmission is based on spatial reuse. If the SR transmission indication information indicates that the uplink transmission is based on spatial reuse, after receiving the second trigger frame, the second station calculates $PW_1$ and $PW_2$ based on the received radio frame and the received second trigger frame, to determine whether to send the uplink frame. If the uplink transmission indicated by the SR transmission indication information is not based on SR, the second station directly sends the uplink frame by using a sending method defined in an existing standard.

It should be noted that before the second access point sends the downlink frame, the first access point may further notify the second access point of information about a time interval in which the at least one first station associated with the first access point performs the uplink data transmission, so that the second access point determines duration of the uplink data transmission performed by the first access point. In an example, the time interval information and the identification information of the second access point may be both carried in the radio frame. In another example, the time interval information may be alternatively separately carried in another frame. The time interval information may be a start moment from which the first access point performs the uplink data transmission and transmission duration; or may be a start moment and an end moment of the uplink data transmission performed by the first access point.

Figure 9:
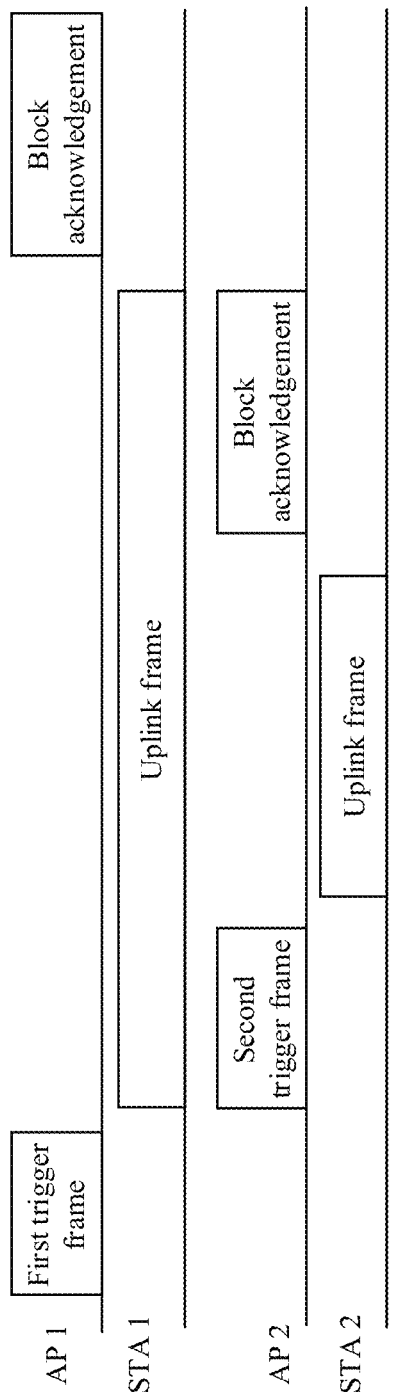
FIG. 9 is a schematic diagram of a time sequence in another spatial reuse method according to an embodiment of this application.

In an example shown in FIG. 9, the radio frame may be a first trigger frame. A frame structure of the first trigger frame is similar to that in FIG. 5, and the identification information may also adopt the foregoing manner. Details are not described herein again.

Figure 10:
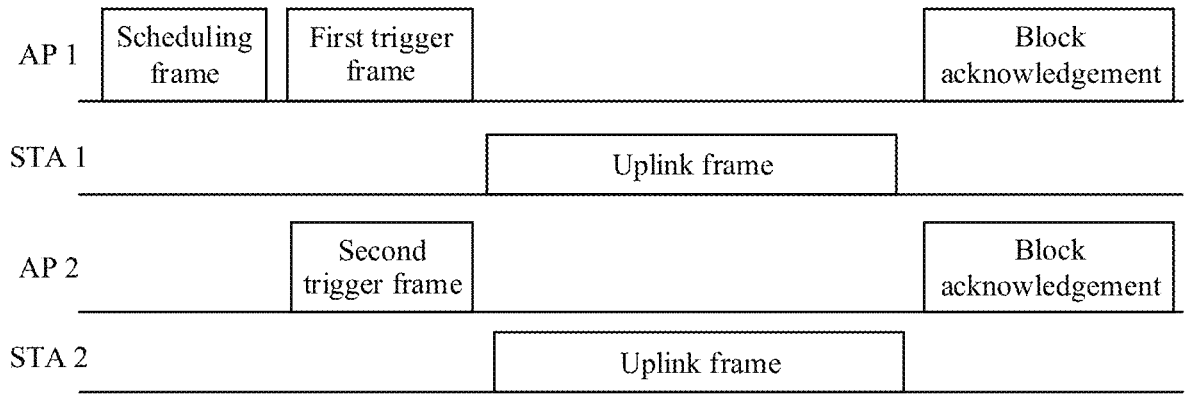
FIG. 10 is a schematic diagram of a time sequence in another spatial reuse method according to an embodiment of this application.

In another example shown in FIG. 10, the radio frame may be a scheduling frame. The scheduling frame includes the control information of the second AP, that is, information about SRP spatial reuse transmission performed by the second AP may be carried in another frame for sending. Specifically, the scheduling frame includes identification information. Optionally, the scheduling frame further includes the spatial reuse parameter SRP and the resource allocation information. The spatial reuse transmission control information of the second AP is separated from the trigger frame, thereby avoiding adjustment and modification to an existing trigger frame structure, to achieve better compatibility.

Figure 11:
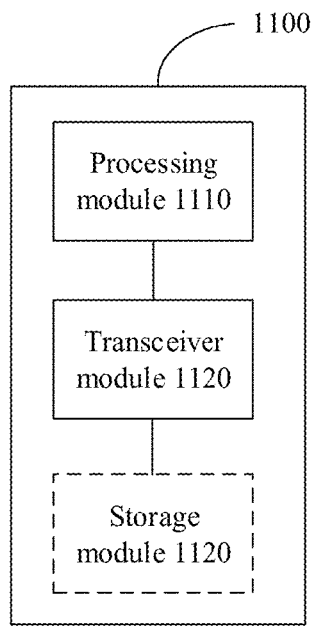
FIG. 11 is a schematic diagram of a spatial reuse apparatus according to an embodiment of this application.

In addition, as shown in FIG. 11, in the uplink transmission, if interference between a trigger frame and a block acknowledgment (MBA) is not considered, it may be considered that the two trigger frames and the two block acknowledgments are sent in alignment.

In the method shown in FIG. 3, the second AP performs downlink transmission. In the method shown in FIG. 8, the second AP triggers the second station to perform uplink transmission. In an example, the first access point AP may further carry an uplink or a downlink transmission indication in the radio frame to indicate whether the second AP performs uplink transmission or downlink transmission after receiving the radio frame, so that the first AP can control a transmission direction of the second AP.

FIG. 11 is a schematic block diagram of a spatial reuse apparatus 1100 according to an embodiment of this application. In an embodiment, the apparatus 1100 shown in FIG. 11 may correspond to the apparatus on the first access point side in the foregoing method embodiment, and may have any function of the first access point in the method. Optionally, the apparatus 1100 in this embodiment of this application may be a first access point, or may be a chip in a first access point.

The apparatus includes a processing module 1110 and a transceiver module 1120. The processing module may be configured to implement management and control on functions of the first access point, so that the apparatus 1100 implements the functions on the first access point side in the foregoing aspects. For example, the processing module 1110 is configured to generate a radio frame. The radio frame includes identification information. The transceiver module 1120 may be configured to support communication between the first access point and a second access point or another node. For example, the transceiver module 1120 is configured to send the radio frame to the second access point.

Optionally, the apparatus 1100 may further include a storage module 1130. The storage module may be, for example, a memory. When the apparatus 1100 includes a storage module 1130, the storage module 1130 is configured to store a computer execution instruction. The processing module 1110 is connected to the storage module 1130, and the processing module 1110 executes the computer execution instruction stored in the storage module 1130, so that the apparatus 1100 performs the foregoing transmission method based on multi-access point AP coordination.

It should be understood that the spatial reuse apparatus 1100 in this embodiment of this application may correspond to the first access point in the spatial reuse methods in the foregoing embodiments, and the foregoing and other management operations and/or functions of the modules in the apparatus 1100 are respectively used to implement corresponding steps of the foregoing methods. For brevity, details are not described herein again.

Figure 12:
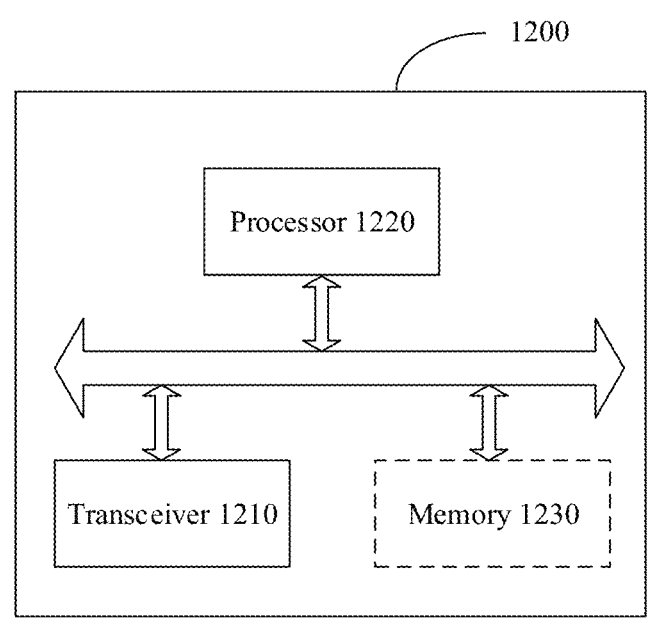
FIG. 12 is a schematic diagram of another spatial reuse apparatus according to an embodiment of this application.

In an example, if the apparatus 1100 is the first access point, the transceiver module 1120 in this embodiment of this application may include a receiving module and a sending module, or may be implemented by using a transceiver 1210; and the processing module 1110 may be implemented by using a processor 1220. FIG. 12 is a schematic structural diagram of a spatial reuse apparatus according to an embodiment of this application. The apparatus 1200 may include a transceiver 1210 and a processor 1220. The processor 1220 may be configured to support a first access point in performing corresponding functions in the foregoing methods, to implement management and control on actions of the first access point AP. The transceiver 1210 may be configured to: support communication between the first access point and a second access point, and receive or send corresponding information or a corresponding instruction in the foregoing methods. The transceiver 1210 may be further configured to support communication between the first access point and another node. In an example, the processor 1220 may perform baseband processing and radio frequency processing on a signal, and the transceiver 1210 such as an antenna may receive and send a signal. For example, the processor may perform baseband processing and radio frequency processing on a signal to generate a radio frame, and then send the radio frame to the second access point by using the antenna. In another example, the processor 1220 may generate a baseband signal, and the transceiver 1210 may include a radio frequency circuit configured to perform radio frequency processing on the baseband signal. The radio frequency circuit may be configured to modulate a low-frequency baseband signal to a high-frequency carrier signal. The high-frequency carrier signal is transmitted by using an antenna. The radio frequency circuit is also configured to demodulate a high-frequency signal received by an antenna to a low-frequency carrier signal. For example, the processor 1220 may generate a radio frame, and then the transceiver 1210 processes (for example, performs analog conversion, filtering, amplification, and up-conversion on) the radio frame and sends the processed radio frame to the second access point. It may be understood that, the transceiver 1210 may further process (for example, perform filtering, amplification, down-conversion, and digitization on) a received signal.

Optionally, the apparatus 1200 may further include a memory 1230. The memory 1230 may be configured to store indication information, and may be further configured to store code, an instruction, and the like executed by the processor 1220.

In another example, if the apparatus 1100 is a chip in a first device, the chip includes a processing module 1110 and a transceiver module 1120. The transceiver module 1120 may be implemented by using the transceiver 1210, and the processing module 1110 may be implemented by using the processor 1220. The transceiver module may be, for example, an input/output interface, a pin, or a circuit. The processing module may execute the computer execution instruction stored in the storage unit. The storage unit may be a storage unit in the chip, for example, a register or a buffer. The storage unit may be alternatively a storage unit located outside the chip and in the first access point, for example, a read-only memory (ROM), or a static storage device in another type that can store static information and an instruction, or a random access memory (RAM).

The apparatus 1100 shown in FIG. 11 may further correspond to the apparatus on the second access point side in the foregoing method embodiment, and may have any function of the second access point in the foregoing method embodiment. The apparatus 1100 in this embodiment of this application may be a second access point, or may be a chip in a second access point.

The apparatus may include a processing module 1110 and a transceiver module 1120. The processing module may be configured to implement management and control on functions of the second access point, so that the apparatus 1100 implements the functions on the second access point side in the foregoing aspects. For example, the processing module 1110 may be configured to generate a downlink frame. The transceiver module 1120 may be configured to communicate with a first access point and another node. For example, the transceiver module 1120 is configured to receive a radio frame sent by the first access point, and the transceiver module 1120 is further configured to send the downlink frame to at least one second station during uplink data transmission performed by at least one first station associated with the first access point.

Optionally, the apparatus 1100 may further include a storage module 1130. When the apparatus includes the storage module 1130, the storage module may be configured to store a computer execution instruction. The storage module is coupled to the processing module. The processing module executes the computer execution instruction stored in the storage module, so that the apparatus implements the functions and the methods related to the second access point in the foregoing aspects.

It should be understood that the apparatus 1100 in this embodiment of this application may correspond to the second access point in the spatial reuse methods in the foregoing embodiments, and the foregoing and other management operations and/or functions of the modules in the apparatus 1100 are respectively used to implement corresponding steps of the foregoing methods. For brevity, details are not described herein again.

In an example, if the apparatus 1100 is the second access point, the transceiver module 1120 in this embodiment of this application may include a receiving module and a sending module, or may be implemented by using a transceiver 1210; and the processing module 1110 may be implemented by using a processor 1220. The storage module 1130 may be, for example, a memory 1230. FIG. 12 is a schematic structural diagram of a transmission apparatus based on multi-access point AP coordination according to an embodiment of this application. The apparatus 1200 may include a transceiver 1210 and a processor 1220. The processor 1220 may be configured to support the second access point in performing corresponding functions in the foregoing methods. The transceiver 1210 may be configured to: support communication between the second access point and the first access point, and receive or send corresponding information or a corresponding instruction in the foregoing methods. In an example, the processor 1220 may perform baseband processing and radio frequency processing on a signal, and the transceiver 1210 such as an antenna may receive and send a signal. For example, the transceiver 1210 may process (for example, perform filtering, amplification, down-conversion, and digitization on) a received radio frame. After parsing the radio frame, the processor 1220 may determine that the radio frame is used to trigger the second access point to send a downlink frame to the at least one station during uplink data transmission performed by the at least one first station associated with the first access point, generate a downlink frame, perform baseband processing and radio frequency processing on the downlink frame, and then send, by using an antenna, the processed downlink frame to at least one second station associated with the second access point. In another example, the processor 1220 may generate a baseband signal; and the transceiver 1210 may include a radio frequency circuit that may be configured to perform radio frequency processing on the baseband signal and may be configured to modulate a low-frequency baseband signal to a high-frequency carrier signal. The high-frequency carrier signal is transmitted by using an antenna. The radio frequency circuit is also configured to demodulate a high-frequency signal received by an antenna to a low-frequency carrier signal. For example, the processor 1220 may generate a radio frame, and then the transceiver 1210 processes (for example, performs analog conversion, filtering, amplification, and up-conversion on) the radio frame and sends the processed radio frame to the station associated with the second access point.

Optionally, the spatial reuse apparatus 1200 may further include a memory 1230. The memory 1230 may be configured to store indication information, and may be further configured to store code, an instruction, and the like executed by the processor 1220. The transceiver 1210 may include a radio frequency circuit.

In another example, if the apparatus 1100 is a chip in the second access point, the chip includes a processing module 1110 and a transceiver module 1120. The transceiver module 1120 may be implemented by using the transceiver 1210, and the processing module 1110 may be implemented by using the processor 1220. The transceiver module may be, for example, an input/output interface, a pin, or a circuit. The apparatus 1100 may further include a storage module 1130. The processing module 1110 may execute a computer execution instruction stored in the storage module 1130. The storage module 1130 may be a storage unit in the chip, for example, a register or a buffer. The storage unit may be alternatively a storage unit located outside the chip and in the second access point, for example, a read-only memory (ROM), or a static storage device in another type that can store static information and an instruction, or a random access memory (RAM).

The apparatus 1100 shown in FIG. 11 may be further configured as the apparatus on the second station side in the foregoing method embodiment, and may have any function of the second station in the foregoing method embodiment. The apparatus 1100 in this embodiment of this application may be a second station, or may be a chip in a second station.

The apparatus may include a processing module 1110 and a transceiver module 1120. The processing module may be configured to implement management and control on functions of the second station, so that the apparatus 1100 implements functions on the second station side in the foregoing aspects.

For example, the processing module 1110 may be configured to generate an acknowledgment frame sent in step S304, and may further generate the uplink frame sent in step S804; and the transceiver module 1120 may be configured to perform step S304 or step S804, and the transceiver module 1120 may support communication between the second station and a second access point. For example, the transceiver module 1120 is configured to receive a downlink frame sent by the second access point; and the transceiver module 1120 may be further configured to send an uplink frame to the second access point during uplink data transmission performed by at least one first station associated with a first access point.

Optionally, the apparatus 1100 may further include a storage module 1130. When the apparatus includes the storage module 1130, the storage module may be configured to store a computer execution instruction. The storage module is coupled to the processing module. The processing module executes the computer execution instruction stored in the storage module, so that the apparatus implements the functions and the methods related to the second station in the foregoing aspects.

It should be understood that the apparatus 1100 in this embodiment of this application may correspond to the second station in the spatial reuse methods in the foregoing embodiments, and the foregoing and other management operations and/or functions of the modules in the apparatus 1100 are respectively used to implement corresponding steps of the foregoing methods. For brevity, details are not described herein again.

In an example, if the apparatus 1100 is the second station, the transceiver module 1120 in this embodiment of this application may include a receiving module and a sending module, or may be implemented by using a transceiver 1210; the processing module 1110 may be implemented by using a processor 1220; and the storage module 1130 may be, for example, a memory 1230. FIG. 12 is a schematic structural diagram of a spatial reuse apparatus on a second station side according to an embodiment of this application. The apparatus 1200 may include a transceiver 1210 and a processor 1220. The processor 1220 may be configured to support the second station in performing corresponding functions in the foregoing methods. The transceiver 1210 may be configured to: support communication between the second station and each of a first access point and a second access point, and receive or send corresponding information or a corresponding instruction in the foregoing methods. In an example, the processor 1220 is configured to determine a first maximum transmit power and a second maximum transmit power based on a radio frame and a downlink frame. In another example, the processor 1220 may include a baseband circuit and a radio frequency circuit, and may perform baseband processing and radio frequency processing on a signal; and the transceiver 1210 may include an antenna, and may receive and send a signal. In still another example, for example, the transceiver 1210 may process (for example, perform filtering, amplification, down-conversion, and digitization on) a received radio frame. After parsing the downlink frame, the processor 1220 may determine that the downlink frame is used to trigger the second access point to send an uplink frame to the second station during uplink data transmission performed by at least one first station associated with the first access point, generate the uplink frame, perform baseband processing and radio frequency processing on the uplink frame, and then send, by using an antenna, the processed uplink frame to the second access point. In another example, the processor 1220 may generate a baseband signal; and the transceiver 1210 may include a radio frequency circuit that may be configured to perform radio frequency processing on the baseband signal and may be configured to modulate a low-frequency baseband signal to a high-frequency carrier signal. The high-frequency carrier signal is transmitted by using an antenna. The radio frequency circuit is also configured to demodulate a high-frequency signal received by an antenna to a low-frequency carrier signal. For example, the processor 1220 may generate the uplink frame, and then the transceiver 1210 processes (for example, performs analog conversion, filtering, amplification, and up-conversion on) the uplink frame and sends the processed uplink frame to the second access point.

Optionally, the apparatus 1200 may further include a memory 1230. The memory 1230 may be configured to store indication information, and may be further configured to store code, an instruction, and the like executed by the processor 1220.

In another example, if the apparatus 1100 is a chip in the second station, the chip includes a processing module 1110 and a transceiver module 1120. The transceiver module 1120 may be implemented by using a transceiver 1210, and the processing module 1110 may be implemented by using a processor 1220. The transceiver module may be, for example, an input/output interface, a pin, or a circuit. The apparatus 1100 may further include a storage module 1130. The processing module 1110 may execute a computer execution instruction stored in the storage module 1130. The storage module 1130 may be a storage unit in the chip, for example, a register or a buffer. The storage unit may be alternatively a storage unit located outside the chip and in the second station, for example, a read-only memory (ROM), or a static storage device in another type that can store static information and an instruction, or a random access memory (RAM).

An embodiment of this application further provides a computer storage medium. The computer-readable storage medium stores an instruction. The instruction may be executed by one or more processors in a processing circuit. When the instruction is run on a computer, the computer is enabled to perform the methods in the foregoing aspects.

Optionally, the storage medium may be specifically the memory 1230.

An embodiment of this application further provides a chip system. The chip system includes a processor, configured to support a distributed unit, a centralized unit, and a first access point or a second access point in implementing functions in the foregoing embodiments, for example, generating or processing data and/or information in the foregoing methods.

In a possible design, the chip system may further include a memory. The memory is configured to store a necessary program instruction and necessary data in the distributed unit, the centralized unit, and the first access point or the second access point. The chip system may include a chip, or may include a chip and another discrete device.

An embodiment of this application further provides a processor. The processor is configured to be coupled to a memory, and is configured to perform the methods in any one of the foregoing first aspect to the fifth aspect or any possible implementation of these aspects.

An embodiment of this application further provides a computer program product including an instruction. When the computer program product is run on a computer, the computer is enabled to perform the methods in any one of the foregoing first aspect to the fifth aspect or any possible implementation of these aspects.

An embodiment of this application further provides a wireless communications system. The system includes the first access point and the second access point in the foregoing aspects. For example, the first access point sends a radio frame to the second access point, to indicate configuring an SRP transmission opportunity for the second access point. After receiving the radio frame, the second access point sends, at a transmit power determined based on an SRP parameter, a data frame to a station associated with the second access point.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Drive), or the like.

What is claimed is:

1. A spatial reuse method, comprising:
receiving, by a second access point (AP), a radio frame sent by a first AP, wherein the radio frame comprises identification information and a spatial reuse parameter (SRP) used by the second AP to determine a transmit power of a downlink frame;
determining, by the second AP based on the identification information and the SRP, that the first AP configures a spatial reuse opportunity for the second AP to perform data transmission; and
sending, by the second AP, a downlink frame to at least one second station (STA) associated with the second AP during an uplink data transmission performed by at least one first STA associated with the first AP.

2. The method according to claim 1, wherein the downlink frame is a second trigger frame used to trigger the at least one second STA to send an uplink frame to the second AP; and wherein the SRP further used by the at least one second STA to determine a first maximum transmit power of the at least one second STA.

3. The method according to claim 2, wherein the second trigger frame comprises a transmit power at which the second AP sends the second trigger frame and a target receive power of the second AP, and wherein the transmit power of the second trigger frame is used by the at least one second STA to determine a second maximum transmit power of the at least one second STA.

4. The method according to claim 3, wherein when the first maximum transmit power is greater than or equal to the second maximum transmit power, the method further comprises:
receiving, by the second AP, the uplink frame sent by the at least one second STA by using the second maximum transmit power; and
when the first maximum transmit power is less than the second maximum transmit power, the method further comprises:
receiving, by the second AP, the uplink frame sent by the at least one second STA by using the first maximum transmit power.

5. The method according to claim 1, wherein when the second AP is a fronthaul AP of a second multi-AP device, the first AP is a fronthaul AP of a first multi-AP device, the first multi-AP device is a parent node of the second multi-AP device, the at least one second STA is a backhaul STA of the second multi-AP device, and the backhaul STA is associated with the first AP, the identification information is an association identifier (AID) of the backhaul STA.

6. The method according to claim 1, wherein the identification information is an association identifier of the second AP, or a media access control (MAC) address of the second AP, or an identifier (ID) of the second AP.

7. The method according to claim 1, wherein the radio frame further comprises resource allocation information used to indicate a resource unit that carries the downlink frame.

8. A spatial reuse method, comprising:
generating, by a first access point (AP), a radio frame that comprises identification information and a spatial reuse parameter (SRP) used by a second AP to determine a transmit power of a downlink frame, wherein the identification information configures a spatial reuse transmission opportunity for the second AP to perform data transmission, and enables the second AP to send a downlink frame to at least one second station (STA) associated with the second AP during an uplink data transmission performed by at least one first station associated with the first AP; and
sending, by the first AP, the radio frame to the second AP.

9. The method according to claim 8, wherein when the second AP is a fronthaul AP of a second multi-AP device, the first AP is a fronthaul AP of a first multi-AP device, the first multi-AP device is a parent node of the second multi-AP device, the at least one second STA is a backhaul STA in the second multi-AP device, and the backhaul STA is associated with the first AP, the identification information is an association identifier (AID) of the backhaul STA.

10. The method according to claim 8, wherein the identification information is an association identifier of the second AP, or a media access control (MAC) address of the second AP, or an identifier (ID) of the second AP.

11. An electronic device operating as a second access point (AP), comprising:
a processor, and
a memory coupled to the processor to store instructions, which when executed by the processor, cause the processor to perform operations, the operations comprising:
receiving a radio frame sent by a first AP, wherein the radio frame comprises identification information and a spatial reuse parameter (SRP) used by the second AP to determine a transmit power of a downlink frame;
determining, based on the identification information and the SRP, that the first AP configures a spatial reuse opportunity for the second AP to perform data transmission; and
sending a downlink frame to at least one second station (STA) associated with the second AP during an uplink data transmission performed by at least one first STA associated with the first AP.

12. The device according to claim 11, wherein the downlink frame is a second trigger frame used to trigger the at least one second STA to send an uplink frame to the second AP; and
wherein the SRP further used by the at least one second STA to determine a first maximum transmit power of the at least one second STA.

13. The device according to claim 12, wherein the second trigger frame comprises a transmit power at which the second AP sends the second trigger frame and a target receive power of the second AP, and wherein the transmit power of the second trigger frame is used by the at least one second STA to determine a second maximum transmit power of the at least one second STA.

14. The device according to claim 13, wherein when the first maximum transmit power is greater than or equal to the second maximum transmit power, the operations further comprise:
receiving the uplink frame sent by the at least one second STA by using the second maximum transmit power; and
when the first maximum transmit power is less than the second maximum transmit power, the operations further comprise:
receiving the uplink frame sent by the at least one second STA by using the first maximum transmit power.

15. The device according to claim 11, wherein when the second AP is a fronthaul AP of a second multi-AP device, the first AP is a fronthaul AP of a first multi-AP device, the first multi-AP device is a parent node of the second multi-AP device, the at least one second STA is a backhaul STA of the second multi-AP device, and the backhaul STA is associated with the first AP, the identification information is an association identifier (AID) of the backhaul STA.

16. The device according to claim 11, wherein the identification information is an association identifier of the second AP, or a media access control (MAC) address of the second AP, or an identifier (ID) of the second AP.

17. The device according to claim 11, wherein the radio frame further comprises resource allocation information used to indicate a resource unit that carries the downlink frame.

* * * * *